(12) United States Patent
Toyama et al.

(10) Patent No.: US 8,212,429 B2
(45) Date of Patent: Jul. 3, 2012

(54) INTERFACE DEVICE FOR HOST DEVICE, INTERFACE DEVICE FOR SLAVE DEVICE, HOST DEVICE, SLAVE DEVICE, COMMUNICATION SYSTEM AND INTERFACE VOLTAGE SWITCHING METHOD

(75) Inventors: Masayuki Toyama, Osaka (JP); Takaharu Yoshida, Osaka (JP); Keisuke Sakai, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/272,534

(22) Filed: Oct. 13, 2011

(65) Prior Publication Data

US 2012/0033717 A1 Feb. 9, 2012

Related U.S. Application Data

(62) Division of application No. 12/810,521, filed as application No. PCT/JP2009/000908 on Feb. 27, 2009, now Pat. No. 8,067,861.

(30) Foreign Application Priority Data

Feb. 29, 2008 (JP) ................................. 2008-049360

(51) Int. Cl.
*G06F 13/00* (2006.01)
*G06F 1/26* (2006.01)
(52) U.S. Cl. ....................................................... 307/151
(58) Field of Classification Search .................... 307/151
See application file for complete search history.

(56) References Cited

U.S. PATENT DOCUMENTS

| 5,627,412 | A | 5/1997 | Beard |
| 5,894,238 | A | 4/1999 | Chien |
| 6,078,319 | A | 6/2000 | Bril et al. |
| 6,256,252 | B1 | 7/2001 | Arimoto |
| 6,512,401 | B2 | 1/2003 | Clark et al. |
| 6,515,507 | B1 | 2/2003 | Patel et al. |
| 6,721,892 | B1 | 4/2004 | Osborn et al. |
| 6,807,126 | B2 | 10/2004 | Kiso |
| 6,949,918 | B2 | 9/2005 | Clark et al. |
| 7,123,049 | B2 | 10/2006 | Satou et al. |
| 7,180,813 | B2 | 2/2007 | Matarrese et al. |
| 7,212,463 | B2 | 5/2007 | Zeevi et a |

(Continued)

FOREIGN PATENT DOCUMENTS

EP 1876509 1/2008

(Continued)

OTHER PUBLICATIONS

International Search Report for corresponding International Application No. PCT/JP2009/000908 dated May 7, 2009.

(Continued)

*Primary Examiner* — Adi Amrany
(74) *Attorney, Agent, or Firm* — Renner, Otto, Boisselle & Sklar, LLP

(57) ABSTRACT

A communication system in which an operating voltage can be selected from a plurality of interface voltages enables an interface voltage to be switched in a stable manner during operation of the system. When the interface voltage is to be switched, a host device (1) and a slave device (2) perform the switching while maintaining the signal level of buses in a stable manner. This structure enables the communication system to switch an interface voltage using a small number of signal lines.

9 Claims, 9 Drawing Sheets

U.S. PATENT DOCUMENTS

| | | |
|---|---|---|
| 7,246,027 B2 | 7/2007 | May et al. |
| 7,290,161 B2 | 10/2007 | Kahn |
| 7,420,866 B2 | 9/2008 | Zeevi et al. |
| 7,522,941 B2 | 4/2009 | Lu |
| 7,600,141 B2 | 10/2009 | Flynn |
| 7,698,575 B2 | 4/2010 | Samson |
| 7,707,435 B2 | 4/2010 | Lee |
| 2004/0128565 A1* | 7/2004 | Horigan ............ 713/300 |
| 2006/0214009 A1* | 9/2006 | Shikata et al. ......... 235/492 |
| 2010/0115165 A1 | 5/2010 | Bandholz et al. |
| 2011/0231690 A1* | 9/2011 | Honda ............ 713/340 |
| 2011/0276748 A1* | 11/2011 | Toyama et al. ........ 711/103 |

FOREIGN PATENT DOCUMENTS

| | | |
|---|---|---|
| JP | 2002-169631 A | 6/2002 |
| JP | 2003-514296 A | 4/2003 |
| WO | 01/35200 | 5/2001 |
| WO | 2006/117966 | 11/2006 |

OTHER PUBLICATIONS

Form PCT/ISA/237 for International Application No. PCT/JP2009/000908 dated May 7, 2009.

Co-pending U.S. Appl. No. 12/810,521, filed Jun. 25, 2010 (allowed claims and application provided).

Co-pending U.S. Appl. No. filed Oct. 13, 2011 (application provided).

* cited by examiner

| Selected interface voltage | 1.8 V |
| --- | --- |
| Consumption power | 100 mA |
| Selectable interface voltage | 3.3 V, 1.8 V |
| Time required for interface voltage switching | 100 ms |
| Error status | No error |
| ... | ... |

INTERFACE DEVICE FOR HOST DEVICE, INTERFACE DEVICE FOR SLAVE DEVICE, HOST DEVICE, SLAVE DEVICE, COMMUNICATION SYSTEM AND INTERFACE VOLTAGE SWITCHING METHOD

TECHNICAL FIELD

The present invention relates to an interface circuit (device) that switches an interface voltage in a stable and efficient manner during operation of a host device and a slave device in a communication system in which an operating voltage can be selected from a plurality of interface voltages, a host device, a slave device, and a communication system including the interface circuit, and an interface voltage switching method.

BACKGROUND ART

In recent years, slave devices that have penetrated the market use large-capacity nonvolatile storage elements, such as flash memories, and process data at a high speed. Examples of such slave devices include secure digital (SD) cards and memory sticks. The slave devices are used in, for example, personal computers, personal digital assistants (PDAs), mobile telephones, digital cameras, audio players, and car navigation systems, which function as host devices that can use the slave devices.

In addition to the memory function, the slave devices that have been commercialized recently can also have, for example, wireless LAN functions, network connection functions for wireless communication based on Bluetooth (trademark), positioning functions using the global positioning system (GPS), and input and output functions such as one-segment broadcasting reception functions for terrestrial digital TV broadcasting. Host devices are connected to these slave device to use the functions of the slave devices.

A communication system that includes such a host device and such a slave device tends to process an increasingly larger amount of data every year. This has generated a market demand for increasing the processing speed of an interface between the host device and the slave device. There also is a market demand for maintaining compatibility with the existing interfaces that are widely used in the market so that the existing interfaces will be usable continuously.

To increase the processing speed of the interface while allowing the existing interface circuit (interface device) to be usable continuously, an interface voltage (voltage used in the interface device) needs to be lowered.

With a conventional technique for selecting an operating voltage of a host device and a slave device from a plurality of interface voltages, the host device and the slave device may have a determination key indicating the level of an interface voltage, and the host device may detect an interface voltage of the slave device and then switch the voltage to be supplied to the slave voltage to determine the interface voltage (see, for example, Patent Citation 1).

Patent Citation 1: Japanese Unexamined Patent Publication No. 2002-169631

DISCLOSURE OF INVENTION

Technical Problem

However, the above conventional technique requires the interface device to have a dedicated terminal for every different interface voltage to determine the interface voltage, and therefore cannot be applied to the existing interface specifications having only a fixed number of interface terminals.

Also, the host device determines the interface voltage by detecting a determination key that has been provided from the slave device. In this case, the host device cannot determine whether switching of the interface voltage has been completed successfully in the slave device when the interface voltage is to be switched during operation (while, for example, the host device and the slave device can transmit and receive data to and from each other). This degrades the reliability of the communication system.

Moreover, the conventional technique assumes that the interface voltage used between the host device and the slave device has the same level as the voltage supplied from the host device to the slave device. With such technique, it is impossible to switch only the voltage of the interface circuit in a stable manner during operation without changing the operating voltage of the slave device.

To solve the above problems, it is an object of the present invention to provide an interface circuit (interface device) that executes switching control of only an interface voltage used between a host device and a slave device in a more reliable manner than conventional techniques while requiring the same number of signal lines as the existing interface specifications, a host device, a slave device, and a communication system including the interface circuit (interface device), and an interface voltage switching method.

Technical Solution

A first aspect of the present invention provides an interface device, used in a host device connected to a slave device to transmit and receive data and/or a command to and from the slave device, that switches an interface voltage used for communication between the slave device and the host device. The interface device includes a clock output unit, a terminal group, and an interface voltage switching unit.

The clock output unit outputs a clock signal for transmitting and receiving the data and/or the command. The terminal group includes one or more input/output terminal units that transmits and receives the data and/or the command using one of a first interface voltage and a second interface voltage. The interface voltage switching unit selects one of the first interface voltage and the second interface voltage and switches the interface voltage used for communication between the host device and the slave device to the selected one of the first and second interface voltages.

The interface voltage switching unit includes a control unit, a clock control unit, and an input/output terminal control unit.

The clock control unit is controlled by the control unit, and fixes a level of a signal output from the clock output unit to a first signal level when the interface voltage used for communication between the host device and the slave device is to be switched, and, when an interface voltage in the host device has been switched to the selected interface voltage, controls the clock output unit to output a clock signal using the selected interface voltage.

The input/output terminal control unit is controlled by the control unit, and sets the one or more input/output terminal units to an input state, and monitors a level of an input signal into the one or more input/output terminal units when the interface voltage used for communication between the host device and the slave device is to be switched, and transmits, when detecting that the level of the input signal into the one or more input/output terminal units becomes a signal level indicating that an interface voltage in the slave device has been switched to the selected interface voltage, transmits a notification indicating the detection result to the control unit.

The control unit determines that the interface voltage in the slave device has been switched when receiving the notification indicating that the interface voltage switching has been completed in the slave device transmitted from the input/output terminal control unit after the clock control unit is set to a state in which the clock signal is being outputted using the selected interface voltage.

This structure enables a host device and a slave device using this interface device for a host device to switch an interface voltage with a simple method while maintaining the signal level of buses (communication paths between the host device and the slave device connected using the terminal group) in a stable manner, and enables the interface voltage switching control to be executed in a more reliable manner than with conventional techniques. As a result, this structure enables an interface voltage to be switched in a stable and efficient manner during operation of a host device and a slave device in a communication system in which an operating voltage can be selected from a plurality of interface voltages while requiring the same number of buses as the existing interface specifications having at least two signal lines.

The interface device may be an interface circuit.

A second aspect of the present invention provides the interface device of the first aspect of the present invention in which the first signal level is a low level.

A third aspect of the present invention provides the interface device of the first or second aspect of the present invention in which the control unit sets all the input/output terminal units to an input state when the interface voltage used for communication between the host device and the slave device is to be switched.

A fourth aspect of the present invention provides the interface device of one of the first to third aspects of the present invention in which the control unit determines that the interface voltage in the host device and the interface voltage in the slave device have been switched when the level of the input signal into the input/output terminal units becomes a high level at the selected interface voltage.

A fifth aspect of the present invention provides an interface device used in a host device connected to a slave device to transmit and receive data and/or a command to and from the slave device, that switches an interface voltage used for communication between the slave device and the host device. The interface device includes a clock output unit, a terminal group, and an interface voltage switching unit.

The clock output unit outputs a clock signal for transmitting and receiving the data and/or the command. The terminal group includes one or more input/output terminal units that transmits and receives the data and/or the command using one of a first interface voltage and a second interface voltage. The interface voltage switching unit selects one of the first interface voltage and the second interface voltage and switches the interface voltage used for communication between the host device and the slave device to the selected one of the first and second interface voltages.

The interface voltage switching unit includes a control unit, a clock control unit, and an input/output terminal control unit.

The clock control unit is controlled by the control unit, and controls the clock output unit to output a signal having a first signal level when the interface voltage used for communication between the host device and the slave device is to be switched, and, when an interface voltage in the host device has been switched to the selected interface voltage, controls the clock output unit to output a clock signal using the selected interface voltage.

The input/output terminal control unit is controlled by the control unit, and sets the one or more input/output terminal units to an output state at the first signal level when the interface voltage used for communication between the host device and the slave device is to be switched, and, when the interface voltage in the host device has been switched to the selected interface voltage, switches the one or more input/output terminal units from the output state at the first signal level to an input state and monitors a level of an input signal into the one or more input/output terminal units, and transmits, when detecting that the level of the input signal into the one or more input/output terminal units becomes a signal level indicating that an interface voltage in the slave device has been switched to the selected voltage, a notification indicating the detection result to the control unit.

The control unit determines that the interface voltage in the slave device has been switched when receiving the notification indicating that the interface voltage switching has been completed in the slave device from the input/output terminal control unit after the clock control unit is set to a state in which a clock signal is being outputted using the selected interface voltage.

This structure enables a host device and a slave device using this interface device for a host device to switch an interface voltage with a simple method while maintaining the signal level of buses (communication paths between the host device and the slave device connected using the terminal group) in a stable manner, and enables the interface voltage switching control to be executed in a more reliable manner than with conventional techniques. As a result, this structure enables an interface voltage to be switched in a stable and efficient manner during operation of a host device and a slave device in a communication system in which an operating voltage can be selected from a plurality of interface voltages while requiring the same number of buses as the existing interface specifications having at least two signal lines.

The interface device may be an interface circuit.

A sixth aspect of the present invention provides the interface device of the fifth aspect of the present invention in which the control unit sets all the input/output terminal units to the output state at the first signal level when the interface voltage used for communication between the host device and the slave device is to be switched.

A seventh aspect of the present invention provides the interface device of the fifth or sixth aspect of the present invention in which the interface voltage switching unit sets an input/output terminal unit for transmitting and receiving data to the output state at the first signal level when the interface voltage is to be switched.

An eighth aspect of the present invention provides the interface device of one of the fifth to seventh aspects of the present invention in which the first signal level is a low level.

A ninth aspect of the present invention provides the interface device of the eighth aspect of the present invention in which the interface voltage switching unit determines that the interface voltage in the host device and the interface voltage in the slave device have been switched when the level of the input signal into the input/output terminal units becomes a high level at the selected interface voltage.

A tenth aspect of the present invention provides an interface device used in a slave device connected to a host device to transmit and receive data and/or a command to and from the host device, that switches an interface voltage used for communication between the slave device and the host device. The interface device includes a clock input unit, a terminal group, and an interface voltage switching unit.

The clock input unit receives input of a clock signal for transmitting and receiving the data and/or the command. The terminal group includes one or more input/output terminal units that transmits and receives the data and/or the command using one of a first interface voltage and a second interface voltage. The interface voltage switching unit selects one of the first interface voltage and the second interface voltage and switches the interface voltage used for communication between the host device and the slave device to the selected one of the first and second interface voltages.

The interface voltage switching unit includes a control unit and an input/output terminal control unit.

The input/output terminal control unit is controlled by the control unit, and controls the one or more input/output terminal units to an output state at a first signal level when the interface voltage used for communication between the host device and the slave device is to be switched, and switches, when an interface voltage in the slave device has been switched to the selected interface voltage, the one or more input/output terminal units from the output state at the first signal level to an input state.

An eleventh aspect of the present invention provides the interface device of the tenth aspect of the present invention in which the input/output terminal control unit controls all the input/output terminal units to the output state at the first signal level when the interface voltage used for communication between the host device and the slave device is to be switched.

A twelfth aspect of the present invention provides the interface device of the tenth or eleventh aspect of the present invention in which the interface voltage switching unit determines that an interface voltage in the host device has been switched to the selected interface voltage through switching the input/output terminal units from the output state at the first signal level to the input state in synchronization with the clock signal inputted into the clock input unit.

A thirteenth aspect of the present invention provides the interface device of one of the tenth to twelfth aspects of the present invention in which the interface voltage switching unit determines that the interface voltage in the host device has been switched to the selected interface voltage when a signal indicating completion of the switching is inputted into the input/output terminal units after switching the input/output terminal units from the output state at the first signal level to the input state in synchronization with the clock signal inputted into the clock input unit.

A fourteenth aspect of the present invention provides the interface device of the tenth or eleventh aspect of the present invention in which the interface voltage switching unit switches the input/output terminal units from the output state at the first signal level to the input state in synchronization with the clock signal inputted into the clock input unit when the interface voltage has been switched.

A fifteenth aspect of the present invention provides the interface device of one of the tenth, eleventh, and fourteenth aspects of the present invention in which the interface voltage switching unit switches at least one of the input/output terminal units that are in the output state at the first signal level to the input state when the interface voltage has been switched, and switches the remaining input/output terminal units that are in the output state at the first signal level to the input state in synchronization with the clock signal inputted into the clock input unit.

A sixteenth aspect of the present invention provides the interface device of one of the tenth to fifteenth aspects of the present invention in which the input/output terminal control unit outputs a signal from the input/output terminal units as an open drain output.

A seventeenth aspect of the present invention provides the interface device of one of the tenth to sixteenth aspects of the present invention in which when the interface voltage switching is terminated incompletely due to an error the interface voltage switching unit switches a command transmission/reception terminal unit, which is included in the terminal group and used to transmit and receive the data and/or the command, from the output state at the first signal level to the input state after a predetermined period elapses.

An eighteenth aspect of the present invention provides the interface device of one of the tenth to seventeenth aspects of the present invention in which the first signal level is a low level.

A nineteenth aspect of the present invention provides the interface device of the eighteenth aspect of the present invention in which the interface voltage switching unit determines that the interface voltage has been switched when the level of the input signal into the input/output terminal units becomes a high level.

A twentieth aspect of the present invention provides a host device that includes the interface device of one of the first to ninth aspects of the present invention, and is connected to a slave device via the interface device to transmit and receive data and/or a command to and from the slave device.

A twenty-first aspect of the present invention provides the host device of the twentieth aspect of the present invention that transmits, to the slave device, a command to obtain a time required for switching the interface voltage in the slave device before a process for switching the interface voltage used for communication between the slave device and the host device is performed.

A twenty-second aspect of the present invention provides the host device of the twentieth or twenty-first aspect of the present invention that transmits, to the slave device, a command to determine whether the interface voltage has been switched successfully after a process for switching the interface voltage used for communication between the slave device and the host device is performed.

A twenty-third aspect of the present invention provides a slave device that includes the interface device of one of the tenth to nineteenth aspects of the present invention and is connected to the host device via the interface device to transmit and receive data and/or a command to and from the host device.

A twenty-fourth aspect of the present invention provides the slave device of the twenty-third aspect of the present invention in which a response to a command transmitted from the host device includes information about a maximum value of a time required for switching the interface voltage.

A twenty-fifth aspect of the present invention provides the slave device of the twenty-third or twenty-fourth aspect of the present invention in which a response to a command transmitted from the host device includes status information indicating that the interface voltage has been switched successfully.

A twenty-sixth aspect of the present invention provides a communication system including the host device of one of the twentieth to twenty-second aspects of the present invention and the slave device of one of the twenty-third to twenty-fifth aspects of the present invention.

A twenty-seventh aspect of the present invention provides an interface voltage switching method for switching an interface voltage used for communication between a host device and a slave device. The method includes processes (1) to (7) below.

In process (1), the host device issues a command instructing to switch an interface voltage to the slave device.

In process (2), the slave device returns a response to the command instructing to switch the interface voltage to the host device.

In process (3), the host device stops providing a clock signal by fixing a level of a clock signal output to the slave device to a first signal level.

In process (4), the host device sets one or more input/output terminal units included in the host device to an input state.

In process (5), the slave device sets one or more input/output terminal units included in the slave device to an output state at the first signal level.

In process (6), the slave device sets the input/output terminal units of the slave device from the output state at the first signal level to the input state when an interface voltage has been switched in the slave device.

In the process (7), the host device resumes to provide the clock signal when the interface voltage switching has been completed in the host device.

In process (8), the host device detects that a signal indicating completion of the interface voltage switching in the slave device has been input into the input/output terminal units of the host device after the clock output is resumed, and determines that the interface voltage has been switched in the slave device.

This method enables a host device and a slave device to switch an interface voltage with a simple method while maintaining the signal level of buses (communication paths between the host device and the slave device connected using the terminal group) in a stable manner, and enables the interface voltage switching control to be executed in a more reliable manner than with conventional techniques. As a result, this method enables an interface voltage to be switched in a stable and efficient manner during operation of a host device and a slave device in a communication system in which an operating voltage can be selected from a plurality of interface voltages while requiring the same number of buses as the existing interface specifications having at least two signal lines.

The processes (1) to (8) in this method may be performed in an order different from the above order.

A twenty-eighth aspect of the present invention provides an interface voltage switching method for switching an interface voltage used for communication between a host device and a slave device that communicate with each other from a first interface voltage V1 to a second interface voltage V2 via a first bus for transmitting a clock signal, a second bus for transmitting a command, and a third bus for transmitting data. The method includes processes (1) to (9) below.

In process (1), the host device issues a command CMD to the slave device to start an interface voltage switching sequence.

In process (2), the slave device returns a response to the command CMD to the host device.

In process (3), the slave device sets a signal level of the second bus and the third bus to a low level immediately after transmitting the response to the host device.

In process (4), the host device stops supplying the clock signal to the slave device, the slave device starts a process for switching the interface voltage after the host device stops providing the clock signal, the host device detects whether the interface voltage switching sequence is to be started by checking a signal level of one of the second bus and the third bus, and the host device 1 aborts the interface voltage switching sequence and executes power cycles when failing to detect a low level as the signal level of the one of the second bus and the third bus.

In process (5), the slave device stabilizes an interface voltage, to which the process for switching the interface voltage has been performed, outputted from a regulator included in the slave device within a predetermined period T1, and the host device fixes a level of the clock signal at a low level for at least the predetermined period T1.

In process (6), the host device 1 resumes to provide a clock signal at the second interface voltage V2 when a voltage output from a regulator included in the host device is stabilized after the predetermined period T1 elapses from the end of the process (4), and the slave device checks whether the level of the clock signal is a signal level that is based on the second interface voltage V2.

In process (7), the slave device 2 detects the clock signal and sets a signal level of the second bus to a high level using the second interface voltage V2 for at least a period of one clock cycle of the clock signal and then frees the second bus.

In process (8), the slave device checks whether the host device sets the signal level of the second bus to the second interface voltage V2 through a pull-up resistor R1 connected to the second bus of the host device.

In process (9), the slave device sets the signal level of the third bus to a high level for at least a period of one clock cycle and then frees the third bus when the process for switching the interface voltage has been completed successfully. The signal level of the third bus is set to a high level within a predetermined period T2 from when providing the clock signal is resumed. The host device checks whether the signal level of the third bus is a high level after the predetermined period T2 elapses from a timing t3 at which providing the clock is started.

This method enables a host device and a slave device to switch an interface voltage with a simple method while maintaining the signal level of buses (communication paths between the host device and the slave device connected using the terminal group) in a stable manner, and enables the interface voltage switching control to be executed in a more reliable manner than with conventional techniques. As a result, this method enables an interface voltage to be switched in a stable and efficient manner during operation of a host device and a slave device in a communication system in which an operating voltage can be selected from a plurality of interface voltages while requiring the same number of buses as the existing interface specifications having at least two signal lines.

The processes (1) to (9) in this method may be performed in an order different from the above order.

A twenty-ninth aspect of the present invention provides an interface voltage switching method for switching an interface voltage used for communication between a host device and a slave device. The method includes processes (1) to (9) below.

In process (1), the host device transmits a command instructing to switch an interface voltage to the slave device.

In process (2), the slave device returns a response to the command instructing to switch the interface voltage to the host device.

In process (3), the host device stops providing a clock signal by fixing a level of a clock signal output to the slave device to a first signal level.

In process (4), the host device sets one or more input/output terminal units included in the host device to an output state at the first signal level.

In process (5), the slave device sets one or more input/output terminal units included in the slave device to the output state at the first signal level.

In process (6), the slave device sets the input/output terminal units of the slave device from the output state at the first signal level to an input state when an interface voltage has been switched in the slave device.

In process (7), the host device resumes to provide the clock signal when the interface voltage has been switched in the host device.

In process (8), the host device sets the input/output terminal units from the output state at the first signal level to an input state when the interface voltage has been switched in the host device.

In process (9), the host device detects that a signal indicating completion of the interface voltage switching in the slave device has been inputted into the input/output terminal units of the host device after the clock output is resumed, and determines that the interface voltage switching has been completed in the slave device.

This method enables a host device and a slave device to switch an interface voltage with a simple method while maintaining the signal level of buses (communication paths between the host device and the slave device connected using the terminal group) in a stable manner, and enables the interface voltage switching control to be executed in a more reliable manner than with conventional techniques. As a result, this method enables an interface voltage to be switched in a stable and efficient manner during operation of a host device and a slave device in a communication system in which an operating voltage can be selected from a plurality of interface voltages while requiring the same number of buses as the existing interface specifications having at least two signal lines.

The processes (1) to (9) in this method may be performed in an order different from the above order.

A thirtieth aspect of the present invention provides the interface voltage switching method of the twenty-seventh or twenty-ninth aspect of the present invention in which the first signal level is a low level.

Part or all of the processes of the interface voltage switching method of one of the twenty-seventh to thirtieth aspects of the present invention may be implemented using a program that is executed by a computer.

Advantageous Effects

The interface circuit (the interface device (the interface device for a host device and the interface device for a slave device)) of the present invention, the host device, the slave device, and the communication system including the interface circuit (the interface device), and the interface voltage switching method enable an interface voltage to be switched while enabling a host device and a slave device to maintain the signal level of buses in a stable manner with a simple method, and enable the interface voltage switching control to be executed in a more reliable manner than with conventional techniques, and thus enable an interface voltage to be switched in a stable and efficient manner during operation of a host device and a slave device in a communication system in which an operating voltage can be selected from a plurality of interface voltages while requiring the same number of buses as the existing interface specifications having at least two signal lines.

EXPLANATION OF REFERENCE

Figure 1:
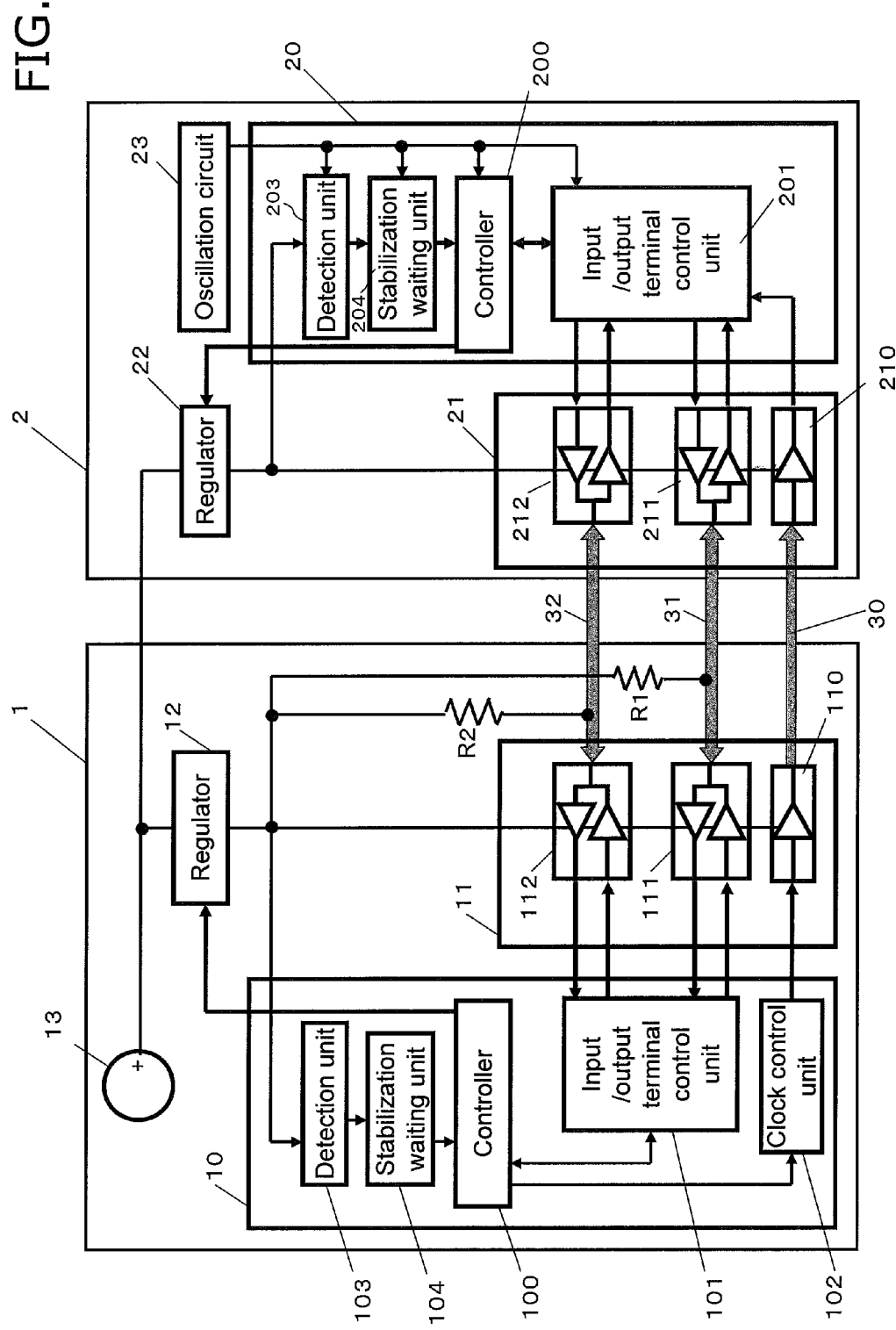
FIG. 1 is a block diagram showing the structure of a communication system according to embodiments of the present invention.

1 host device
10 interface voltage switching unit
100 controller
101 input/output terminal control unit
102 clock control unit
11 terminal group
110 clock output terminal
111 command transmission/reception terminal
112 data transmission/reception terminal
12 regulator
13 voltage source
2 slave device
20 interface voltage switching unit
200 controller
201 input/output terminal control unit
21 terminal group
210 clock input terminal
211 command transmission/reception terminal
212 data transmission/reception terminal
22 regulator
30 clock transmission bus
31 command transmission/reception bus
32 data transmission/reception bus

BEST MODE FOR CARRYING OUT THE INVENTION

Embodiments of the present invention will now be described with reference to the drawings. In the embodiments, the same components are given the same reference numerals.

First Embodiment

FIG. 1 shows the structure of a communication system according to a first embodiment of the present invention.

As shown in FIG. 1, the communication system according to the first embodiment includes a host device 1 and a slave device 2. The host device 1 and the slave device 2 are connected to each other with buses 30 to 32.

The buses 31 and 32 are connected to an output voltage of a regulator, which will be described later, via pull-up resistors R1 and R2.

The bus 30 is used to transmit clock signals. The bus 31 is used to transmit and receive commands. The bus 32 is used to transmit and receive data.

The commands are transmitted from the host device 1 to the slave device 2 to, for example, write or read to or from a register, write or read to or from a memory area, or obtain the status of the slave device 2.

The commands and the data are transmitted and received on the buses 31 and 32 basically in synchronization with the clock signals transmitted on the bus 30. However, when the buses 31 and 32 are used to transmit and receive asynchronous signals, such as signals associated with an interrupt, these signals may not be synchronized with the clocks transmitted on the bus 30. The host device 1 and the slave device 2 operate using a first interface voltage (described later) when the system is powered on.

1.1 Structure of the Host Device

The structure of the host device 1 will be described first.

As shown in FIG. 1, the host device 1 includes an interface voltage switching unit 10, a terminal group 11, a regulator 12, and a voltage source 13. The other components of the host device 1 that are not essential to the present invention are not shown in the figure.

The interface voltage switching unit 10 includes a controller 100, an input/output terminal control unit 101, a clock control unit 102, a detection unit 103, and a stabilization waiting unit 104.

The controller 100 transmits a command to switch an interface voltage (interface voltage switching command) to the slave device 2, and also executes a series of control associated with an interface voltage switching process performed by the host device 1.

The input/output terminal control unit 101 controls an input signal and an output signal that received/transmitted via input/output terminal units 111 and 112, which are included in the terminal group 11 (described later).

The clock control unit 102 controls a signal to be outputted via a clock output terminal 110, which is included in the terminal group 11 (described later).

The detection unit 103 and the stabilization waiting unit 104 detect whether or not the voltage value of an output voltage from the regulator 12 is stabilized after the interface voltage switching is performed. The detection unit 103 and the stabilization waiting unit 104 may be formed using hardware, or more specifically by a detection circuit and a stabilization waiting circuit, or may alternatively be formed using both hardware and software.

The terminal group 11 includes the clock output terminal unit 110, the command transmission/reception terminal unit 111, and the data transmission/reception terminal unit 112.

The clock output terminal unit 110 includes an output buffer, and is connected to the bus 30.

The command transmission/reception terminal unit 111 and the data transmission/reception terminal unit 112 each include a bidirectional input/output buffer. The command transmission/reception terminal unit 111 is connected to the bus 31, and the data transmission/reception terminal unit 112 is connected to the bus 32.

The regulator 12 outputs an interface voltage on which the buffers included in the terminal group 11 operate. The voltage output from the regulator 12 is either a first interface voltage (for example, 3.3 V) or a second interface voltage (for example, 1.8 V). The voltage output from the regulator 12 is switched between the first interface voltage and the second interface voltage according to instructions from the controller 100.

The voltage source 13 supplies a voltage on which the host device 1 and the slave device 2 operate.

1.2 Structure of the Slave Device

The structure of the slave device 2 will now be described.

As shown in FIG. 1, the slave device 2 includes an interface voltage switching unit 20, a terminal group 21, a regulator 22, and an oscillation circuit 23. The other components of the slave device 2 that are not essential to the present invention are not shown in the figure.

The interface voltage switching unit 20 includes a controller 200, an input/output terminal control unit 201, a detection unit 203, and a stabilization waiting circuit 204.

The controller 200 executes a series of control associated with an interface voltage switching process performed by the slave device 2 based on a command to switch an interface voltage (interface voltage switching command) transmitted from the host device 1.

The input/output terminal control unit 201 controls an input signal and an output that received/transmitted signal via input/output terminal units 211 and 212 and a clock input terminal unit 210, which are included in the terminal group 21 (described later).

The detection unit 203 and the stabilization waiting unit 204 detect whether or not the voltage value of an output voltage from the regulator 22 is stabilized after the interface voltage switching is performed. The detection unit 203 and the stabilization waiting unit 204 may be formed using hardware, or more specifically by a detection circuit and a stabilization waiting circuit, or may alternatively be formed using both hardware and software.

The terminal group 21 includes the clock input terminal unit 210, the command transmission/reception terminal unit 211, and the data transmission/reception terminal unit 212.

The clock input terminal unit 210 includes an input buffer, and is connected to the bus 30.

The command transmission/reception terminal unit 211 and the data transmission/reception terminal unit 212 each include a bidirectional input/output buffer. The command transmission/reception terminal unit 211 is connected to the bus 31, and the data transmission/reception terminal unit 212 is connected to the bus 32.

The regulator 22 outputs an interface voltage on which the buffers included in the terminal group 21 operate. The voltage output from the regulator 22 is either a first interface voltage (for example, 3.3 V) or a second interface voltage (for example, 1.8 V). The voltage output from the regulator 22 is switched to the first interface voltage or to the second interface voltage as instructed by the controller 200.

The voltage range of the first interface voltage (for example, 2.7 to 3.6 V) outputted from the regulators 12 and 22 and the voltage range of the second interface voltage (for example, 1.65 to 1.95 V) outputted from the regulators 12 and 22 are common between the host device 1 and the slave device 2.

The interface voltage switching unit 20 operates in synchronization with clocks (clock signals) input from the host device 1 via the bus 30 and/or clocks (clock signals) provided from the oscillation circuit 23 included in the slave device 2.

1.3 Operation for Switching Interface Voltage

A procedure for switching an interface voltage performed by the host device 1 and the slave device 2 included in the communication system according to the first embodiment of the present invention will now be described with reference to the flowchart of FIG. 2.

Figure 2:
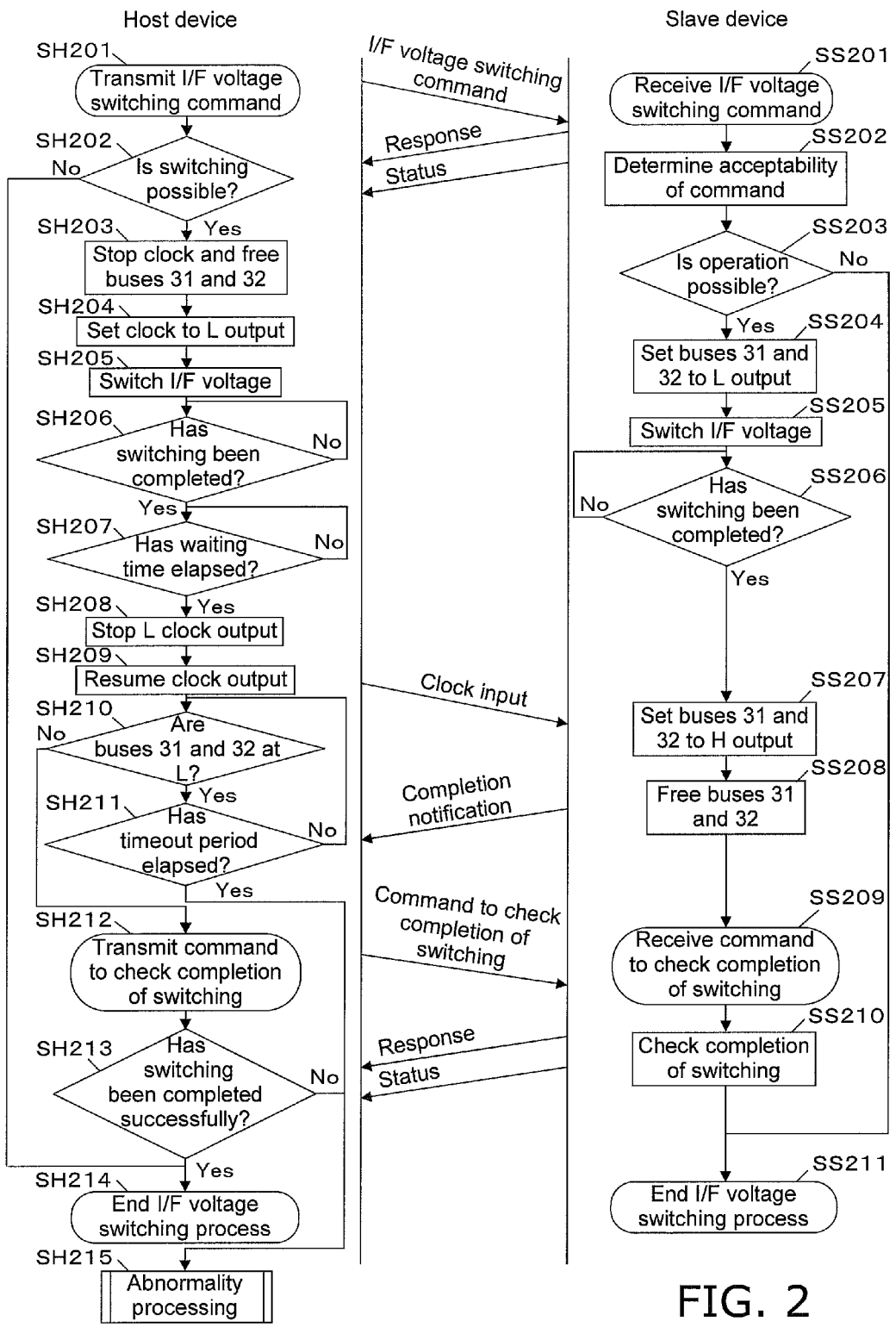
FIG. 2 is a flowchart showing a procedure for switching an interface voltage in a communication system according to a first embodiment of the present invention.

In the communication system according to the present embodiment, as shown in FIG. 2, the slave device 2 operates in accordance with a command transmitted from the host device 1. To switch the interface voltage, therefore, the controller 100 of the host device 1 first transmits a command for switching an interface voltage (I/F voltage switching command) to the slave device 2 (SH201).

The controller 200 of the slave device 2 receives the I/F voltage switching command from the host device 1 (SS201), and determines whether the received command is acceptable (SS202), and transmits its response and status to the host device 1.

The response includes information indicating whether the slave device 2 has correctly accepted the command.

The status includes information indicating an interface voltage which the slave device 2 can switch to, as well as the current interface voltage of the slave device 2.

The controller 100 of the host device 1 determines whether the slave device 2 can switch its interface voltage based on the information included in the received response and status signal (SH202). When determining that the switching is impossible, the controller 100 ends the process (SH214). When determining that the switching is possible, the controller 100 instructs the clock control unit 102 to stop outputting clock signals (stops transmission of clock signals from the host device 1 to the slave device 2) and to free the buses 31 and 32 (SH203).

Subsequently, the controller 100 of the host device 1 controls the clock output terminal unit 110 to output a low-level signal to the bus 30 (SH204). The "low level" herein refers to the signal level indicating 0, among the two levels of digital signals: 1 and 0. In FIG. 2, letter L indicates a low-level signal. In contrast, the "high level" refers to the signal level indicating 1, among the two digital signal levels: 1 and 0. In FIG. 2, letter H indicates a high-level signal. The same applies to the description given hereafter.

The controller 100 of the host device 1 operates to switch the output voltage of the regulator 12 (SH205), and waits until switching of the output voltage is completed while monitoring the voltages of the detection unit (detection circuit) 103 and the stabilization waiting unit (stabilization waiting circuit) 104 (SH206). When determining that the switching has been completed, the host device 1 further waits until a predetermined waiting time elapses (SH207).

Figures 8, 9:
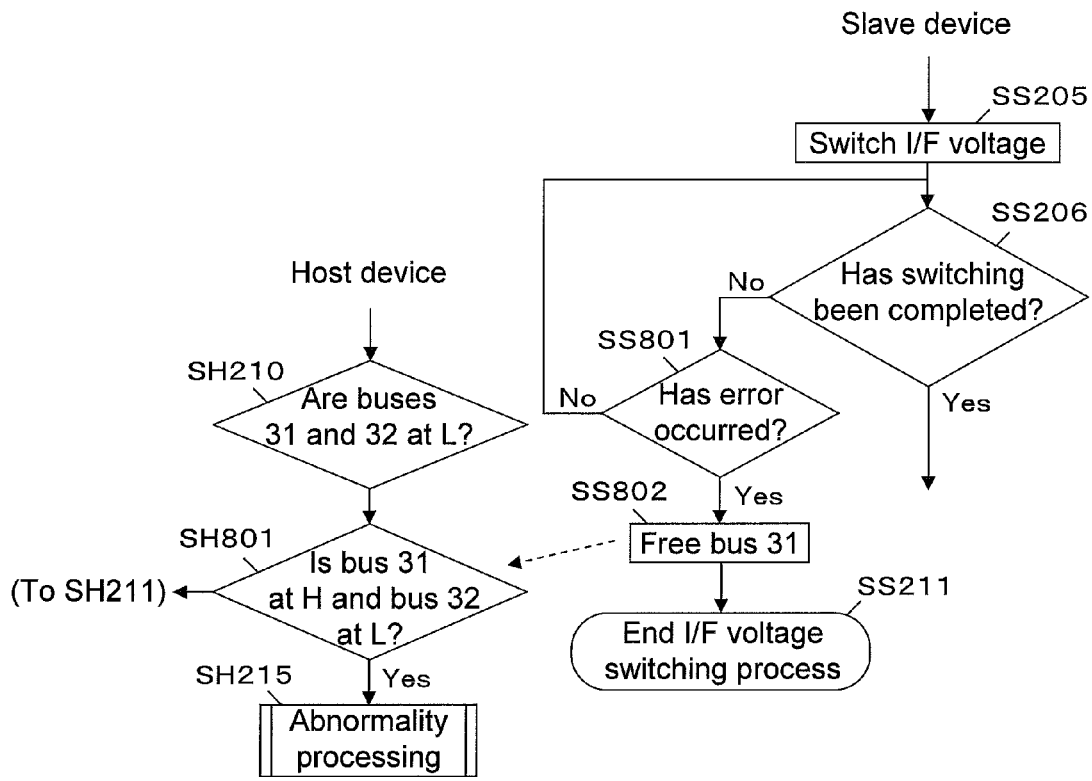
FIG. 8 is a flowchart showing processing of an error that occurs during interface voltage switching performed in the communication system according to the embodiments of the present invention.
FIG. 9 is a diagram describing a status returned from a slave device in the communication system according to the embodiments of the present invention.

The predetermined waiting time may be a fixed period of time that is set in advance, a period of time required for switching included in the status information shown in FIG. 9, or the longer of the two periods.

The controller 200 of the slave device 2 determines whether it is possible to switch the voltage to the interface voltage indicated by the I/F voltage switching command received from the host device 1 (SS203). When determining that the switching is impossible, the controller 200 of the slave device 2 ends the I/F voltage switching process (SS211). When determining that the switching is possible, the controller 200 instructs the input/output terminal control unit 201 to control the input/output terminal units 211 and 212 to output a low-level signal to the buses 31 and 32 (SS204).

Subsequently, the controller 200 operates to switch the output voltage of the regulator 22 (SS205), and waits until switching of the output voltage is completed while monitoring the outputs from the detection unit (detection circuit) 203 and the stabilization waiting unit (stabilization waiting circuit) 204 (SS206).

When the predetermined waiting time elapses, the controller 100 of the host device 1 instructs the clock control unit 102 to stop the output of low-level signals from the clock output terminal 110 (SH208), and then resumes the clock signal output (for example, the output of clock signals with the interface voltage of, for example, 1.8 V, to which the interface voltage switching has been performed) (resumes transmission of clock signals to the slave device 2) (SH209).

When the clock signals (for example, clock signals with the interface voltage of, for example, 1.8 V, to which the interface voltage switching has been performed) are received as input by the clock input terminal unit 210 of the slave device 2 (after determining that the clock signals have been inputted into the clock input terminal unit 210), the controller 200 of the slave device 2 determines whether the voltage switching has been completed in the slave device 2. When determining that the voltage switching has been completed in the slave device 2, the controller 200 instructs the input/output terminal control unit 201 to output high-level signals (for example, high-level signals having the interface voltage of, for example, 1.8 V, to which the interface voltage switching has been performed) from the input/output terminal units 211 and 212 to the buses 31 and 32 (SS207).

Subsequently, the controller 200 of the slave device 2 frees the buses 31 and 32 to set these buses to an input state (SS208), and transmits a notification that the interface voltage switching has been completed to the host device 1.

In this state, the slave device 2 can recognize that the interface voltage switching has been completed in the host device 1.

The buses 31 and 32 are connected to the regulator output (interface voltage) via the pull-up resistors R1 and R2. Thus, when the slave device 2 frees the buses 31 and 32 and sets these buses to an input state, the signal level on the buses 31 and 32 will shift from a low level to a high level in the host device 1.

The controller 100 of the host device 1 monitors whether the signal level on the buses 31 and 32 is still at a low level after the clock signal output is resumed (SH210), and also determines whether the monitoring time exceeds a predetermined timeout period (SH211). When the timeout period elapses and the signal level on the buses 31 and 32 remains at a low level, the host device 1 determines that an error has occurred, and performs an abnormality processing (SH215). When the signal level on the buses 31 and 32 shifts to a high level before the timeout period elapses, the controller 100 determines that the interface voltage switching has been completed in the slave device 2.

In this state, the interface voltage switching is complete both in the host device 1 and the slave device 2.

The host device 1 may further transmit a command to determine whether the switching has been completed successfully. In this case, the controller 100 transmits a command to perform a switching success/failure determination process (SH212). The controller 200 of the slave device 2 receives the switching success/failure determination command from the host device 1 (SS209), determines whether the switching operation of the slave device 2 has been completed (SS210), returns its response and status to the host device 1, and then ends the process (SS211). The status includes information indicating the selected interface voltage as shown in FIG. 9. Alternatively, the information may not be included in the status but may be included in the response.

The controller 100 of the host device 1 determines whether the interface voltage switching has been completed successfully in the slave device 2 based on the information included in the response and the status received from the slave device 2 (SH213). When determining that the interface voltage switching has been completed successfully in the slave device 2, the controller 100 of the host device 1 ends the interface voltage switching process. When failing to determine that the interface voltage switching has been completed successfully and detecting an abnormality or an error, the controller 100 of the host device 1 performs the abnormality processing (SH215). In the abnormality processing, the host device 1 re-starts (or power-cycles) the slave device 2, and communicates with the slave device 2 through the terminal group 11 of the host device 1 and the terminal group 21 of the slave device 2 using the first interface voltage.

Figure 3:
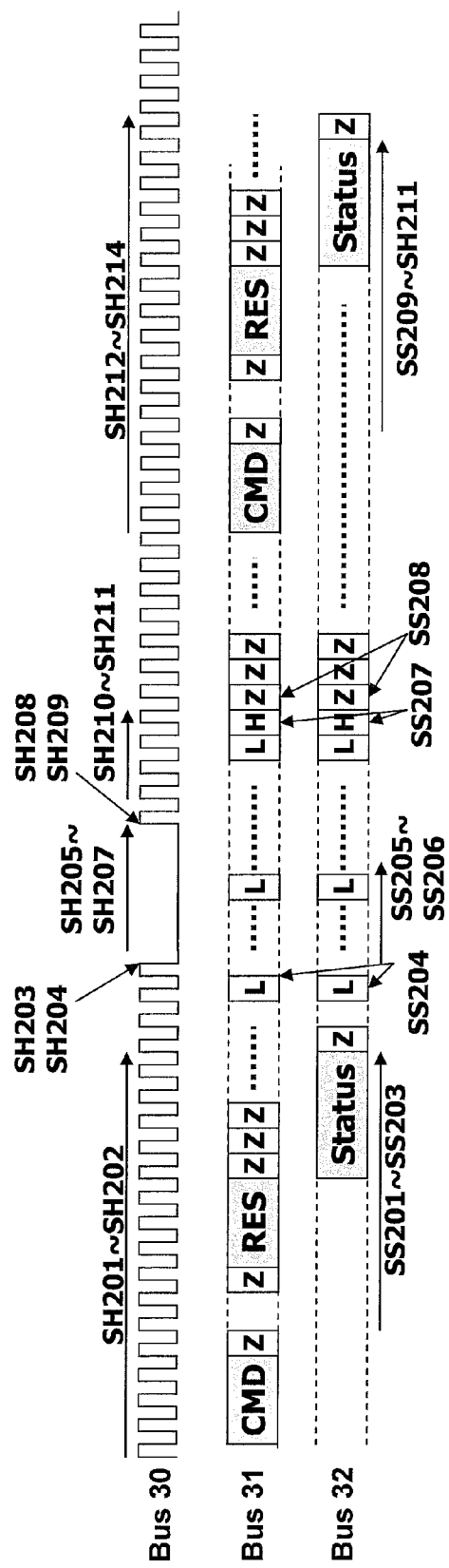
FIG. 3 is a timing chart showing the interface voltage switching procedure in the communication system according to the first embodiment of the present invention.

FIG. 3 is a timing chart illustrating the waveforms of signals on the buses 30, 31, and 32 when the interface voltage of the host device 1 and the slave device 2 is switched with the procedure described based on the flowchart of FIG. 2 in the communication system according to the first embodiment of the present invention.

In FIG. 3, symbols "CMD", "RES", "Status", "H", "L", and "Z" represent the following:

CMD: An I/F voltage switching command is transmitted from the host device 1 to the slave device 2.

RES: A response is returned from the slave device 2 to the host device 1.

Status: A status is returned from the slave device 2 to the host device 1.

H: A high-level signal is being outputted from the host device 1 or the slave device 2.

L: A low-level signal is being outputted from the host device 1 or the slave device 2.

Z: No signal is being outputted from the host device 1 and the slave device 2, and the bus is fixed to an interface voltage via the pull-up resistor.

As described above, the communication system of the present embodiment switches the interface voltage while enabling the host device 1 and the slave device 2 to maintain the electric potentials of the buses in a stable manner.

Example 1

An example of the communication system of the present embodiment described above will now be described with reference to FIG. 3A.

In the present example (hereafter referred to as "example 1"), the interface voltage is switched from a first interface voltage V1 (for example, 3.3 V) to a second interface voltage V2 (<V1) (for example, 1.8 V).

For ease of explanation, the operation of the communication system of example 1 will be described using processes (1) to (9), which are indicated by the corresponding numerals (1) to (9) in FIG. 3A.

Process (1):
The host device 1 issues a command CMD to start a voltage switch sequence (voltage switching process).

Process (2):
The slave device 2 returns a response to the host device 1.

Process (3):
The slave device 2 drives the signal level on the bus 31 (bus for transmitting a command CMD in FIG. 3A) and the bus 32 (bus for transmitting data DAT in FIG. 3A) to a low level immediately after transmitting the response to the host device 1.

Process (4):
The host device stops supplying clocks (clocks transmitted on the bus 30) (to the slave device 2). After the host device 1 stops clocks, the slave device 2 starts switching voltage. The time to stop the clocks is not specified.

Figure 3A:
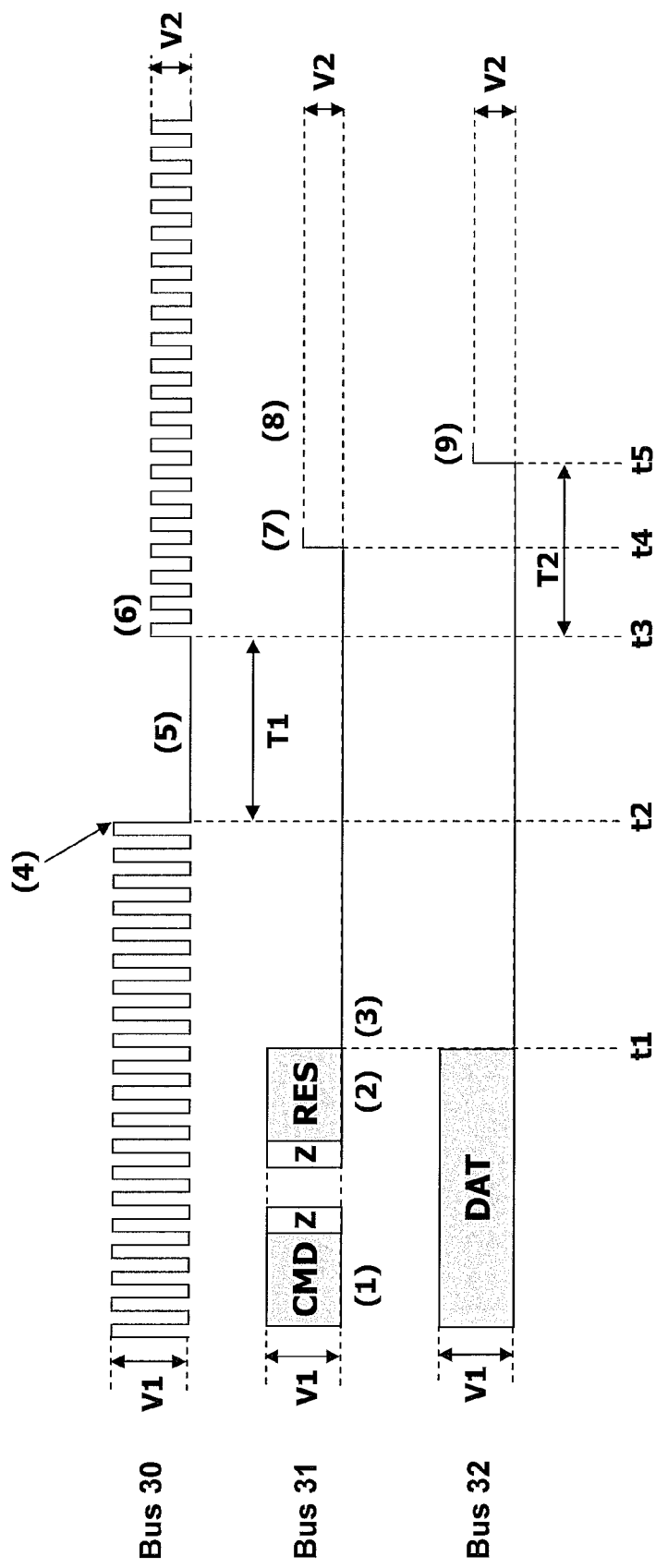
FIG. 3A is a timing chart showing an example of the interface voltage switching procedure in the communication system according to the first embodiment of the present invention.

The host device 1 can detect whether the interface voltage switching sequence (process) starts by checking the signal level of either the bus 31 (bus for transmitting and receiving a command CMD in FIG. 3A) or the bus 32 (bus for transmitting and receiving data DAT in FIG. 3A).

Which signal should be checked depends on the ability of the host device 1.

If low level is not detected, the host device 1 aborts the interface voltage switching sequence, and executes power cycle.

Process (5):
The voltage to which the switching has been performed, which is output from the regulator 22 of the slave device 2 (the second interface voltage V2 of, for example, 1.8 V), shall be stable within a predetermined period T1 (for example 5 ms) (period between t2 and t3 in FIG. 3A).

The host device 1 keeps the clocks low at least the predetermined period T1 (for example, 5 ms). This means that the predetermined period T1 (for example, 5 ms) is the maximum value for the slave device 2 and the minimum value for the host device 1.

Process (6):
When the regulator 12 (or specifically the voltage output from the regulator 12) is stabilized after the predetermined period T1 (for example, 5 ms) elapses from the end of the process (4) (timing t2 in FIG. 3A), the host device 1 starts (resumes) providing clocks at the second interface voltage V2 (for example, 1.8 V).

The slave device 2 can check whether the voltage of the clocks is the second interface voltage V2 (for example, 1.8V).

Process (7):
By detecting clocks, the slave device 2 drives the signal level on the bus 31 (bus for transmitting and receiving a command CMD in FIG. 3A) to high at the second interface voltage V2 (for example, 1.8 V) at least one clock and then frees the bus (stops driving the bus) (sets the bus to a high impedance state (tri-state)). For example, outputting a high-level signal and freeing the bus are performed in synchronization with clocks transmitted on the bus 30.

Process (8):
The slave device 2 can check whether the host device 1 drives the voltage on the bus 31 (bus for transmitting and receiving a command CMD in FIG. 3A) to the second interface voltage V2 (for example, 1.8 V) through the pull-up resistor R1 of the host device 1.

The buses 31 and 32 are connected to the regulator output (interface voltage) via the pull-up resistors R1 and R2. Thus, when the slave device 2 frees the buses 31 and 32 and sets these buses to an input state, the signal level on the buses 31 and 32 will shift from a low level to a high level in the host device 1.

Process (9):
When the switching of the interface voltage (the process for switching from the voltage V1 of, for example, 3.3 V to the voltage V2 of, for example, 1.8 V) is completed successfully, the slave device drives the signal level on the bus 32 (bus for transmitting and receiving data DAT in FIG. 3A) to a high level (stops driving the bus) (sets the bus to a high impedance state) at least a period of one clock cycle and then stop driving (tri-state). For example, outputting a high-level signal and freeing the bus are performed in synchronization with clocks transmitted on the bus 30.

The signal level on the bus 32 (bus for transmitting and receiving data DAT in FIG. 3A) is set to a high level within a predetermined period T2 (for example, 1 ms at maximum) (period between t3 and t5 in FIG. 3A) from the start (resumption) of providing the clocks.

The host device 1 checks whether the signal level on the bus 32 (bus for transmitting and receiving data DAT in FIG. 3A) is a high level after the predetermined period T2 (for example, after 1 ms) elapses from the start timing at which clocks are provided (timing t3 in FIG. 3). This means that the predetermined period T2 (for example, 1 ms at maximum) is a maximum value for the slave device 2, and is a minimum value for the host device 1.

After the interface voltage switching sequence is completed, the host device 1 and the slave device 2 start communicating with each other using the interface voltage to which the switching has been performed.

In FIG. 3A, the period between t4 and t5 may for example correspond to 1 ms at maximum. The timing t4 may be the same timing as the timing t5 (t4=t5).

As described above in example 1, the communication system of the present embodiment switches the interface voltage while enabling the host device 1 and the slave device 2 to maintain the potentials of the buses in a stable manner.

Example 1 is a mere example, and the present invention should not be limited to such an example.

Second Embodiment

A procedure for switching an interface voltage performed by a host device 1 and a slave device 2 included in a communication system according to a second embodiment of the present invention will now be described with reference to the flowchart of FIG. 4.

In the communication system of the present embodiment, an input/output terminal 112 of the host device 1 and an input/output terminal 212 of the slave device 2 can output a signal as an open drain output. The other components are the same as the corresponding components shown in FIG. 1.

2.1 Operation for Switching Interface Voltage

Figure 4:
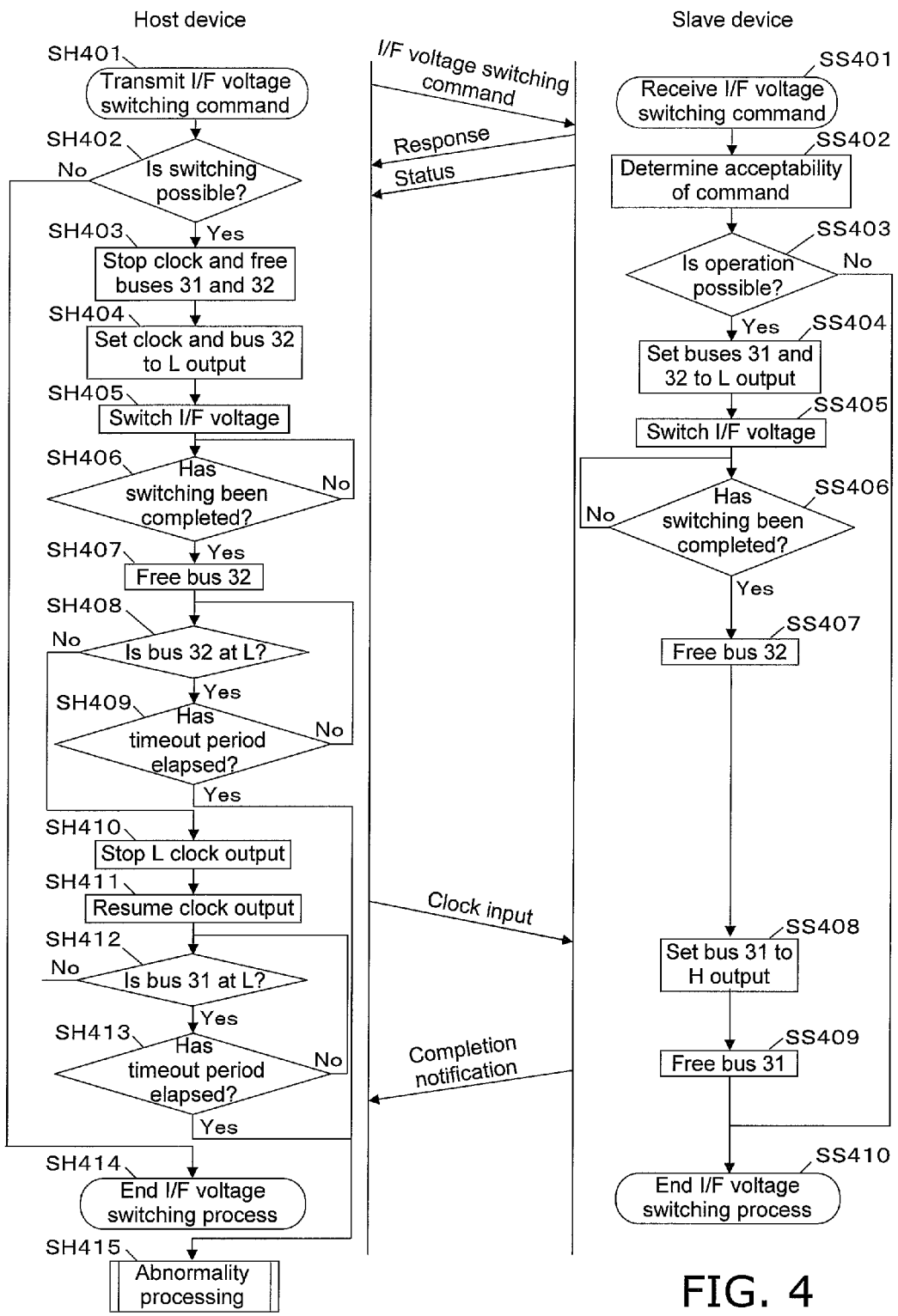
FIG. 4 is a flowchart showing a procedure for switching an interface voltage in a communication system according to a second embodiment of the present invention.

In the communication system of the present embodiment, as shown in FIG. 4, the slave device 2 operates in accordance with a command transmitted from the host device 1. To switch the interface voltage, therefore, the controller 100 of the host device 1 first transmits a command for switching an interface voltage (I/F voltage switching command) to the slave device 2 (SH401).

The controller 200 of the slave device 2 receives the I/F voltage switching command from the host device 1 (SS401), determines whether the received command is acceptable (SS402), and transmits its response and status to the host device 1. The response and the status include the same information as the information included in the response and the status transmitted from the slave device 2 described in the first embodiment.

The controller 100 of the host device 1 determines whether the slave device 2 can switch its interface voltage based on the information included in the received response and status signal (SH402). When determining that the switching is impossible, the controller 100 ends the process (SH415). When determining that the switching is possible, the controller 100 instructs the clock control unit 102 to stop outputting clocks (stops transmission of clock signals from the host device 1 to the slave device 2) and to free the buses 31 and 32 (SH403).

Subsequently, the controller 100 of the host device 1 controls the clock output terminal unit 110 to output a low-level signal to the bus 30, and the input/output terminal unit 112 to output a low-level signal to the bus 32 (SH404).

Subsequently, the controller 100 of the host device 1 operates to switch the output voltage of the regulator 12 (SH405), and waits until switching of the output voltage is completed while monitoring the outputs from the detection unit (detection circuit) 103 and the stabilization waiting unit (stabilization waiting circuit) 104 (SH406). When determining that the switching has been completed, the controller 100 of the host device 1 frees the bus 32 and sets the bus to an input state (SH407).

The controller 200 of the slave device 2 determines whether it is possible to switch the voltage to the interface voltage indicated by the I/F voltage switching command received from the host device 1 (SS403). When determining that the switching is impossible, the controller 200 of the slave device 2 ends the I/F voltage switching process (SS410). When determining that the switching is possible, the controller 200 instructs the input/output terminal control unit 201 to control the input/output terminal units 211 and 212 to output a low-level signal to the buses 31 and 32 (SS404).

Subsequently, the controller 200 of the slave device 2 operates to switch the output voltage of the regulator 22 (SS405), and waits until switching of the output voltage is completed while monitoring the outputs from the detection unit (detection circuit) 203 and the stabilization waiting unit (stabilization waiting circuit) 204 (SS406). When determining that the switching has been completed, the controller 200 instructs the input/output terminal control unit 201 to free the bus 32 and set the bus to an input state (SS407).

More specifically, when the voltage switching is yet to be completed in either the host device 1 or the slave device 2, the signal level on the bus 32 will be at a low level. When the voltage switching is completed in both the host device 1 and the slave device 2, the signal level on the bus 32 will be at a high level, which is determined by the output voltage of the regulator 12 that is connected to the bus 32 via the pull-up resistor R2. The input/output terminals 112 and 212 can output a signal as an open drain output, with which both the host device 1 and the slave device 2 can drive the bus to a low level.

After freeing the bus 32 and setting the bus to an input state, the controller 100 of the host device 1 monitors whether the signal level on the bus 32 is still at a low level (SH408), and also determines whether the monitoring time exceeds a predetermined timeout period (SH409). When the timeout period elapses with the signal level on the bus 32 being maintained at a low level, the host device 1 determines that an error has occurred, and performs abnormality processing (SH415). When the signal level on the bus 32 shifts to a high level before the timeout period elapses, the controller 100 determines that the interface voltage switching has been completed in the slave device 2. In this case, the controller 100 instructs the clock control unit 102 to stop outputting low-level signals from the clock output terminal 110 (SH410), and then resumes the clock signal output (resumes transmission of clock signals to the slave device 2) (SH411).

When the clock signals are received as input by the clock input terminal unit 210, the controller 200 of the slave device 2 instructs the input/output terminal control unit 201 to control the input/output terminal unit 211 to output a high-level signal to the bus 31 in synchronization with the clock signals (SS408). The controller 200 then frees the bus 31 and sets the bus to an input state (SS409), and transmits a notification that the interface voltage switching has been completed to the host device 1 and ends the process (SS410).

When freeing the bus 31, The slave device 2 recognizes that the interface voltage switching has been completed in the host device 1.

The bus 31 is connected to the regulator output (interface voltage) via the pull-up resistor R1. Thus, when the slave device 2 frees the bus 31 and sets the bus to an input state, the signal level on the bus 31 will shift from a low level to a high level in the host device 1.

After the clock signal output is resumed, the controller 100 of the host device 1 monitors whether the signal level on the bus 31 is still at a low level (SH412), and also determines whether the monitoring time exceeds the predetermined timeout period (SH413). This process is performed to detect an abnormality that would prevent the slave device 2 from freeing the bus 31 and setting the bus to an input state. When the timeout period elapses with the signal level on the bus 31 being maintained at a low level, the host device 1 determines that an error has occurred and performs the abnormality processing (SH415). When the signal level on the bus 31 shifts to a high level before the timeout period elapses, the controller 100 of the host device 1 determines that the interface voltage switching has been completed in the slave device 2, and ends the process (SH414). In the abnormality processing, the host device 1 re-starts (power-cycles) the slave device 2, and communicates with the slave device 2 by operating the terminal group 11 of the host device 1 and the terminal group 21 of the slave device 2 using the first interface voltage.

Although not shown, the host device 1 may transmit a command to determine whether the switching has been completed successfully to the slave device 2 as described previously with reference to FIG. 2 so as to determine whether the interface voltage switching has been completed successfully in the slave device 2.

Figure 5:
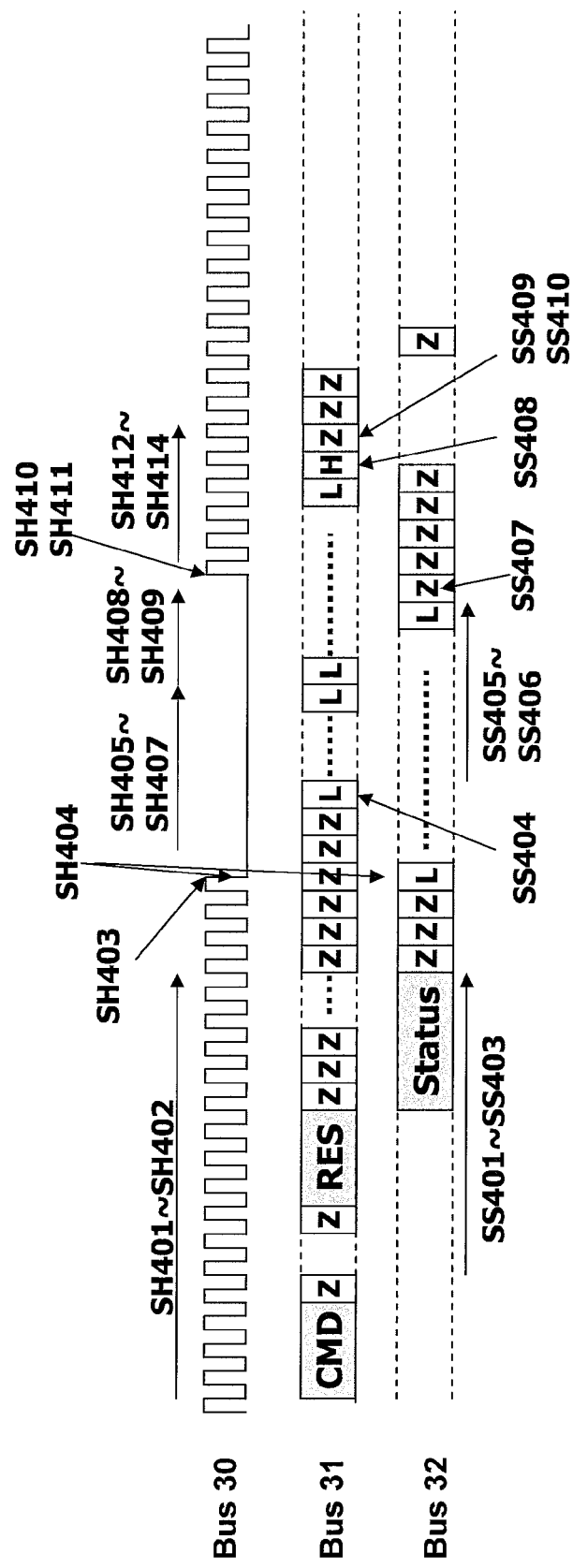
FIG. 5 is a timing chart showing the interface voltage switching procedure in the communication system according to the second embodiment of the present invention.

FIG. 5 is a timing chart illustrating the waveforms of signals on the buses 30, 31, and 32 when the interface voltage of the host device 1 and the slave device 2 is switched with the procedure described based on the flowchart of FIG. 4 in the communication system according to the present embodiment. In FIG. 5, symbols "CMD", "RES", "Status", "H", "L", and "Z" have the same meanings as those used in FIG. 3.

FIG. 5 shows the case in which the interface voltage switching is completed earlier in the host device 1 than in the slave device 2. The signal level on the bus 32 is still at a low level after the interface voltage switching is completed in the host device 1 (SH407). On the other hand, even in a case when the interface voltage switching is completed earlier in the slave device 2 than in the host device 1, the signal level on the bus 32 will change in the same manner as shown in FIG. 5. The signal level on the bus 32 shifts from L to Z when the interface voltage switching is completed in both the host device 1 and the slave device 2.

As described above, the communication system of the present embodiment switches the interface voltage while enabling the host device 1 and the slave device 2 to maintain the electric potentials of the buses in a stable manner, and also enables the host device 1 and the slave device 2 to determine the completion of each other's voltage switching with a simple method. Also, the communication system of the present embodiment enables the host device 1 and the slave device 2 to immediately determine the completion of each other's processing by monitoring the signal level on the bus 32, and shortens the time required for the voltage switching.

Third Embodiment

A procedure for switching an interface voltage performed by a host device 1 and a slave device 2 included in a communication system according to a third embodiment of the present invention will now be described with reference to the flowchart of FIG. 6.

The components of the host device 1 and the slave device 2 included in the communication system of the present embodiment are the same as the components described with reference to FIG. 1.

3.1 Operation for Switching Interface Voltage

Figure 6:
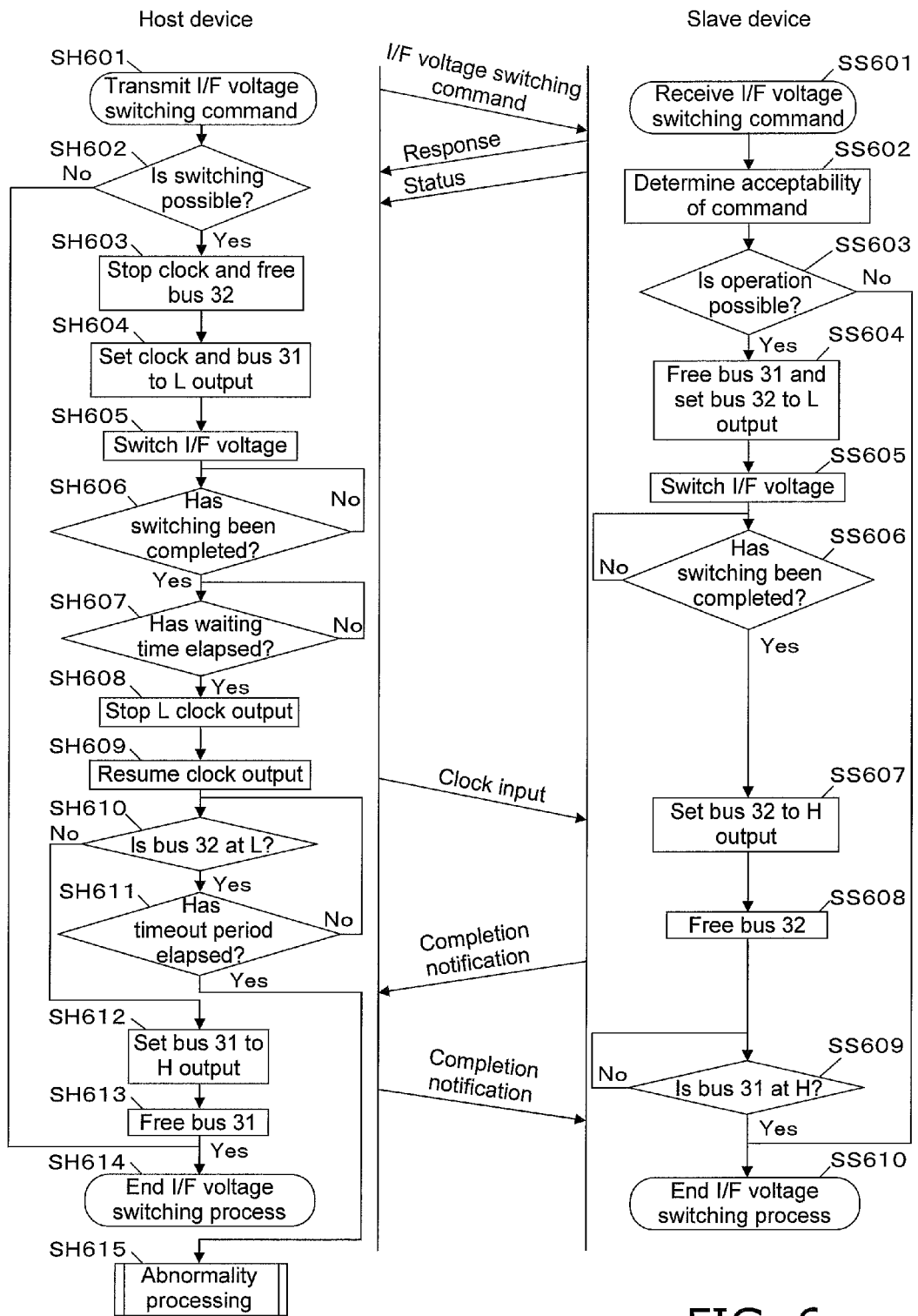
FIG. 6 is a flowchart showing a procedure for switching an interface voltage in a communication system according to a third embodiment of the present invention.

In the communication system of the third embodiment, as shown in FIG. 6, the slave device 2 operates in accordance with a command transmitted from the host device 1. To switch the interface voltage, therefore, the controller 100 of the host device 1 first transmits a command for switching an interface voltage (I/F voltage switching command) to the slave device 2 (SH601).

The controller 200 of the slave device 2 receives the I/F voltage switching command from the host device 1 (SS601), and determines whether the received command is acceptable (SS602), and transmits its response and status to the host device 1. The response and the status include the same information as the information included in the response and the status described in the first embodiment.

The controller 100 of the host device 1 determines whether the slave device 2 can switch its interface voltage based on the information included in the received response and status signal (SH602). When determining that the switching is impossible, the controller 100 ends the process (SH614).

When determining that the switching is possible, the controller 100 of the host device 1 instructs the clock control unit 102 to stop outputting clocks (stops transmission of clock signals from the host device 1 to the slave device 2) to free the bus 32 (SH603).

Subsequently, the controller 100 of the host device 1 controls the clock output terminal unit 110 and the input/output terminal unit 111 to output a low-level signal to the buses 30 and 31 (SH604).

Subsequently, the controller 100 of the host device 1 operates to switch the output voltage of the regulator 12 (SH605), and waits until switching of the output voltage is completed while monitoring the outputs from the detection unit (detection circuit) 103 and the stabilization waiting unit (stabilization waiting circuit) 104 (SH606).

When determining that the switching has been completed, the host device 1 waits until a predetermined waiting time elapses (SH607). The predetermined waiting time may be a fixed period of time that is set in advance, a period of time required for switching included in the status information shown in FIG. 9, or the longer of the two.

The controller 200 of the slave device 2 determines whether it is possible to switch the voltage to the interface voltage indicated by the I/F voltage switching command received from the host device 1 (SS603). When determining that the switching is impossible, the controller 200 of the slave device 2 ends the I/F voltage switching process (SS610). When determining that the switching is possible, the controller 200 instructs the input/output terminal control unit 201 to free the bus 31 and set the bus to an input state, and also to output a low-level signal to the bus 32 (SS604).

Subsequently, the controller 200 of the slave device 2 operates to switch the output voltage of the regulator 22 (SS605), and waits until switching of the output voltage is completed while monitoring the outputs from the detection unit (detection circuit) 203 and the stabilization waiting unit (stabilization waiting circuit) 204 (SS606).

When the predetermined waiting time elapses, the controller 100 of the host device 1 instructs the clock control unit 102 to stop the output of low-level signals from the clock output terminal unit 110 (SH608), and then resumes the clock signal output (SH609). After the clock signals are received as input by the clock input terminal unit 210, the controller 200 of the slave device 2 instructs the input/output terminal control unit 201 to output a high-level signal from the input/output terminal unit 212 to the bus 32 (SS607) when determining that the voltage switching has been completed. The controller 200 then frees the bus 32 and sets the bus to an input state (SS608), and transmits a notification that the interface voltage switching has been completed to the host device 1.

The bus 32 is connected to the regulator output (interface voltage) via the pull-up resistor 2. Thus, when the slave device 2 frees the bus 32 and sets the bus to an input state, the signal level on the bus 32 will shift from a low level to a high level in the host device 1.

After the clock signal output is resumed, the controller 100 of the host device 1 monitors whether the signal level on the bus 32 is still at a low level (SH610), and also determines whether the monitoring time exceeds the predetermined timeout period (SH611). When the timeout period elapses with the signal level on the bus 32 being maintained at a low level, the host device 1 determines that an error has occurred, and performs abnormality processing (SH615). When the signal level on the bus 32 shifts to a high level before the timeout period elapses, the controller 100 of the host device 1 determines that the interface voltage switching has been completed in the slave device 2, and instructs the input/output terminal control unit 101 to output a high-level signal to the bus 31 (SH612) and frees the bus 31 (SH613).

The slave device 2 determines that the signal level on the bus 31 has shifted to a high level (SS609), and determines that the interface voltage switching has been completed in the host device 1.

In this state, the interface voltage switching is complete both in the host device 1 and the slave device 2. Although not shown in FIG. 6, the host device 1 may transmit a command to determine whether the switching has been completed successfully. The operation of the host device 1 and the slave device 2 in this case is the same as the corresponding operation in the first embodiment described with reference to FIG. 2.

Figure 7:
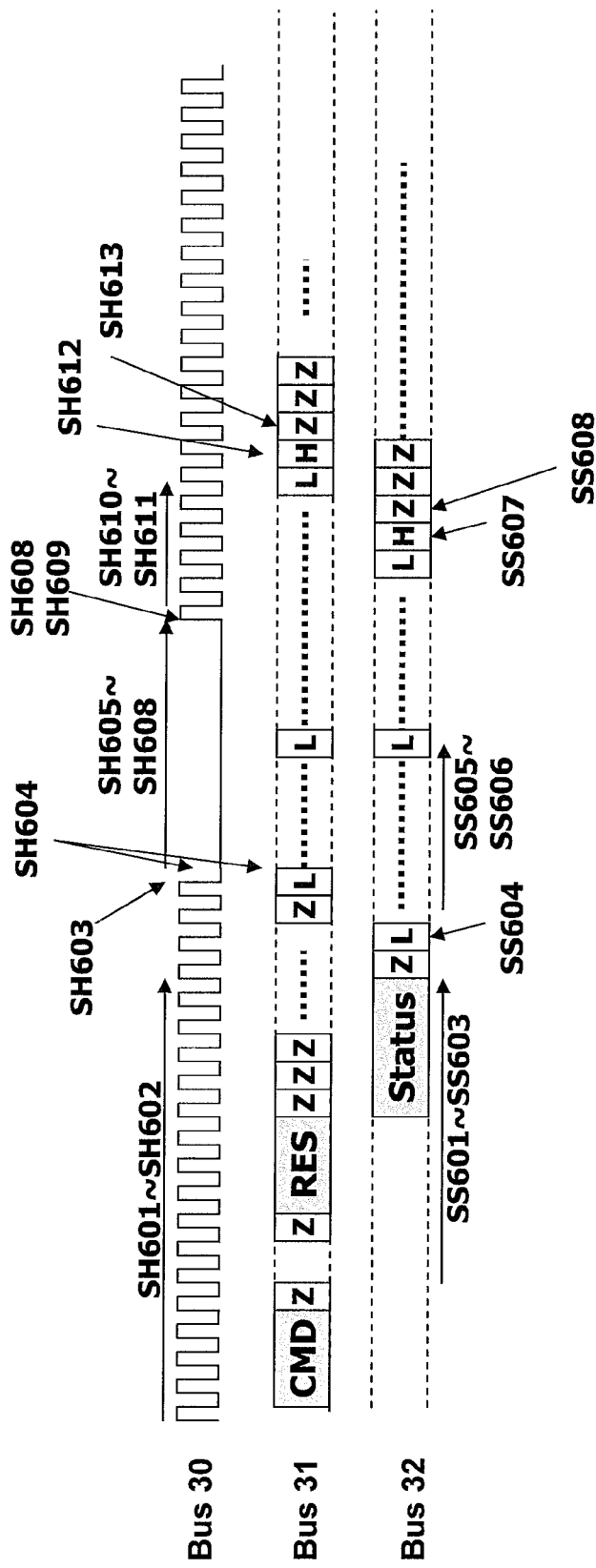
FIG. 7 is a timing chart showing the interface voltage switching procedure in the communication system according to the third embodiment of the present invention.

FIG. 7 is a timing chart illustrating the waveforms of signals on the buses 30, 31, and 32 when the interface voltage of the host device 1 and the slave device 2 is switched with the procedure described based on the flowchart of FIG. 6 in the communication system according to the present embodiment. In FIG. 7, symbols "CMD", "RES", "Status", "H", "L", and "Z" have the same meanings as those used in FIG. 3.

As described above, the communication system of the present embodiment switches the interface voltage while enabling the host device 1 and the slave device 2 to maintain the electric potentials of the buses in a stable manner, and also enables the host device 1 and the slave device 2 to determine the completion of each other's voltage switching with a simple method.

Other Embodiments

In the flowchart of FIG. 2, the processes for switching the interface voltage in the slave device 2, or the processes from SS205 to SS206, can be terminated incompletely due to an error.

FIG. 8 is a flowchart showing the process performed by the slave device 2 for notifying the host device 1 of such an error as well as the process performed by the host device 1 when such an error has occurred in the slave device 2. FIG. 8 only shows the steps different from the steps shown in the flowchart of FIG. 2, and steps that are not shown in FIG. 8 are the same as the corresponding steps shown in FIG. 2.

In FIG. 8, the controller 200 of the slave device 2 determines whether an error has occurred during the interface voltage switching process (SS801). When detecting no error, the controller 200 continues the switching process (SS206). When detecting an error, the controller 200 instructs the input/output terminal control unit 201 to stop outputting a low-level signal to the bus 31 to free the bus 31 (SS802), and ends the process (SS211).

The host device 1 waits for a voltage switching completion notification from the slave device 2 while monitoring the state of the buses 31 and 32 (SH210). When the signal level on the bus 31 is at a high level and the signal level on the bus 32 is at a low level, the host device 1 determines that an error has occurred, and performs abnormality processing (SH215).

Through the above process, the slave device 2 can notify the host device 1 of an error with a simple method (process) in the communication system. The host device 1 then performs the abnormality processing to enable the communication system to recover.

Although the regulator 12 of the host device 1 outputs the first interface voltage or the second interface voltage based on the supply voltage from the voltage source 13 in the above embodiments, the present invention should not be limited to this structure. The regulator 12 may select an output voltage from a plurality of voltages supplied from a plurality of voltage sources or from a plurality of generated voltages.

In the same manner, although the regulator 22 of the slave device 2 outputs the first interface voltage or the second interface voltage based on the supply voltage from the voltage source 13, the present invention should not be limited to this structure. The regulator 22 may select an output voltage from a plurality of voltages supplied from a plurality of voltage sources or from a plurality of generated voltages.

In such a communication system in which the interface voltage can be selected not only from the first interface voltage and the second interface voltage but also from a plurality of voltages, the host device 1 includes a processing unit for determining the range of interface voltages with which the slave device 2 can operate and a processing unit for instructing the voltage to be used when transmitting an interface voltage switching command from the host device 1 to the slave device 2.

Also, the bus arrangement of the host device 1 and the slave device 2 should not be limited to the arrangement shown in the block diagram of FIG. 1. For example, when the communication system performs asynchronous transmission and reception of data, the system does not need the clock signals (the bus 30, the input/output terminal units 110 and 210, and the clock control unit 102). Also, although the bus 31 is used to transmit and receive commands and the bus 32 is used to transmit and receive data including the status data in the above embodiments, the present invention should not be limited to this structure. The buses may be selected freely for each purpose. Further, the number of data buses included in the communication system should not be limited to two. To increase the speed of data transfer, the communication system may include, for example, four or eight buses for transmitting and receiving data.

The slave device 2 may not necessarily return a response and a status when receiving a command transmitted from the host device 1. Instead, the slave device 2 may only transmit a response containing necessary information, or it may not transmit a response.

The slave device 2 including the interface circuit (interface device) of the present invention may be a removable device, such as a memory card or an input/output card, or may be an LSI device in which a controller LSI, memory, and other functional blocks are enclosed in a single package, which is soldered onto a substrate.

The host device 1 and the slave device 2 may not necessarily be included in different devices (for example, the host device 1 included in a personal computer and the slave device 2 included in an SD card). For example, both the host device 1 and the slave device 2 may be included in a single device (for example, both the host device 1 and the slave device 2 included in a single personal computer or in a single mobile telephone).

Each block of the communication system, the host device, and the slave device described in the above embodiments may be formed using a single chip with a semiconductor device, such as LSI (large-scale integration), or some or all of the blocks of the communication system, the host device, and the slave device may be formed using a single chip.

It should be noted that although hereinabove an LSI has been described, depending on differences in the degree of integration, it may be also referred to as an IC, system LSI, super LSI, or ultra LSI.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks. Biotechnology is potentially applicable.

The processes described in the above embodiments may be realized using either hardware or software, or may be realized using both software and hardware. When the communication system, the host device, and the slave device of the above embodiments are implemented by hardware, the communication system, the host device, and the slave device require timing adjustment for each of their processes. For ease of explanation, timing adjustment associated with various signals required in an actual hardware design is not described in detail in the above embodiments.

The specific structures described in the above embodiments are mere examples of the present invention, and may be changed and modified variously without departing from the scope and spirit of the invention.

APPENDIXES

The present invention may also be expressed as follows.

Appendix 1

An interface circuit that is used in a host device connected to a slave device to transmit and receive data and/or a command to and from the slave device, the interface circuit comprising:

a clock output that is used to transmit and receive the data and/or the command; and a terminal group that has one or more input/output terminals, wherein transmission and reception of the data and/or the command via the terminal group is performed using one of a first interface voltage and a second interface voltage, and the interface circuit includes an interface voltage switching unit that selects one of the first interface voltage and the second interface voltage and switches to the selected one of the first and second interface voltages, the interface voltage switching unit includes a clock control unit that fixes a level of the clock output to a low level when an interface voltage of the host device and the slave device is to be switched, and resumes the clock output using an interface voltage to which the switching has been performed when the interface voltage switching has been completed in the host device, and an input/output terminal control unit that sets the one or more input/output terminals to an input status when the interface voltage of the host device and the slave device is to be switched, and detects that an input signal into the input/output terminals becomes a signal level indicating completion of the switching, and the interface voltage switching unit detects that a signal indicating completion of the switching has been input into the input/output terminals after the clock output is resumed, and determines that the interface voltage switching has been completed in the slave device.

Appendix 2

The interface circuit according to appendix 1, wherein the interface voltage switching unit sets all the input/output terminals to an input status when the interface voltage is to be switched.

Appendix 3

The interface circuit according to one of appendixes 1 and 2, wherein the interface voltage switching unit determines that the switching has been completed when the level of the input signal into the input/output terminals becomes a high level.

Appendix 4

An interface circuit that is used in a host device connected to a slave device to transmit and receive data and/or a command to and from the slave device, the interface circuit comprising:

a clock output that is used to transmit and receive the data and/or the command; and a terminal group that has one or more input/output terminals, wherein transmission and reception of the data and/or the command via the terminal group is performed using one of a first interface voltage and a second interface voltage, and the interface circuit includes an interface voltage switching unit that selects one of the first interface voltage and the second interface voltage and switches to the selected one of the first and second interface voltages, the interface voltage switching unit includes a clock control unit that controls the clock output to be a low level output when an interface voltage of the host device and the slave device is to be switched, and resumes the clock output using an interface voltage to which the switching has been performed when the interface voltage switching has been completed in the host device, and an input/output terminal control unit that sets the one or more input/output terminals to a low level output status when the interface voltage of the host device and the slave device is to be switched, and switches the input/output terminals from the low level output status to an input status when the interface voltage switching has been completed in the host device, and detects that a level of an input signal into the input/output terminals becomes a signal level indicating completion of the switching, and the interface voltage switching unit detects that a signal indicating completion of the switching has been input into the input/output terminals after the clock output is resumed, and determines that the interface voltage switching has been completed in the slave device.

Appendix 5

The interface circuit according to appendix 4, wherein
the interface voltage switching unit sets all the input/output terminals to a low level output status when the interface voltage is to be switched.

Appendix 6

The interface circuit according to appendix 4, wherein
the interface voltage switching unit sets the input/output terminals that are used to transmit and receive data to a low level output status when the interface voltage is to be switched.

Appendix 7

The interface circuit according to one of appendixes 4 to 6, wherein
the interface voltage switching unit determines that the switching has been completed when the level of the input signal into the input/output terminals becomes a high level.

Appendix 8

An interface circuit that is used in a slave device connected to a host device to transmit and receive data and/or a command to and from the host device, the interface circuit comprising:
a clock input that is used to transmit and receive the data and/or the command; and
a terminal group that has one or more input/output terminals,
wherein transmission and reception of the data and/or the command via the terminal group is performed using one of a first interface voltage and a second interface voltage, and
the interface circuit includes an interface voltage switching unit that selects one of the first interface voltage and the second interface voltage and switches to the selected one of the first and second interface voltages, and
the interface voltage switching unit that sets the one or more input/output terminals to a low level output status when the interface voltage of the host device and the slave device is to be switched, and switches the input/output terminals from the low level output status to an input status when the interface voltage switching has been completed in the slave device.

Appendix 9

The interface circuit according to appendix 8, wherein
the input/output terminal control unit controls all the input/output terminals to be in the low level output status.

Appendix 10

The interface circuit according to appendix 8, wherein
the interface voltage switching unit determines that the interface voltage switching has been completed in the host device when switching the input/output terminals from the low level output status to the input status in synchronization with the clock input.

Appendix 11

The interface circuit according to appendix 8, wherein
the interface voltage switching unit determines that the interface voltage switching has been completed in the host device when a signal indicating completion of the switching is input into the input/output terminals after switching the input/output terminals from the low level output status to the input status in synchronization with the clock input.

Appendix 12

The interface circuit according to appendix 8, wherein
the interface voltage switching unit switches the input/output terminals from the low level output status to the input status in synchronization with the clock input when the interface voltage switching has been completed in the slave device.

Appendix 13

The interface circuit according to appendix 8, wherein
the interface voltage switching unit switches at least one of the input/output terminals that are in the low level output status to the input status when the interface voltage switching has been completed, and switches the remaining input/output terminals that are in the low level output status to the input status in synchronization with the clock input from the host device.

Appendix 14

The interface circuit according to appendix 8, wherein
the input/output terminal control unit outputs a signal from the input/output terminals as an open drain output.

Appendix 15

The interface circuit according to appendix 8, wherein
when the interface voltage switching is terminated incompletely due to an abnormality, the interface voltage switching unit switches a command transmission/reception terminal from the low level output status to the input status after a predetermined period elapses.

Appendix 16

The interface circuit according to one of appendixes 8 to 15, wherein
the interface voltage switching unit determines that the switching has been completed when the level of the input signal into the input/output terminals becomes a high level.

Appendix 17

A host device, comprising:
the interface circuit according to one of appendixes 1 to 3, wherein the host device is connected to a slave device via the interface circuit to transmit and receive data and/or a command to and from the slave device.

Appendix 18

The host device according to appendix 17, wherein
the host device transmits a command to obtain a time required for the interface voltage switching by the slave device before the interface voltage switching is started.

Appendix 19

The host device according to appendix 17, wherein
the host device transmits a command to determine whether the interface voltage switching has been completed successfully after the interface voltage switching is completed.

Appendix 20

A host device, comprising:
the interface circuit according to one of appendixes 4 to 7,
wherein the host device is connected to a slave device via the interface circuit to transmit and receive data and/or a command from the slave device.

Appendix 21

The host device according to appendix 20, wherein
the host device transmits a command to obtain a time required for the interface voltage switching by the slave device before the interface voltage switching is started.

Appendix 22

The host device according to appendix 20, wherein
the host device transmits a command to determine whether the interface voltage switching has been completed successfully after the interface voltage switching is completed.

Appendix 23

A slave device, comprising:
the interface circuit according to one of appendixes 8 to 16,
wherein the slave device is connected to a host device via the interface circuit to transmit and receive data and/or a command to and from the host device.

Appendix 24

The slave device according to appendix 23, wherein
a response to a command transmitted from the host device includes a maximum value of a time required for the interface voltage switching.

Appendix 25

The slave device according to appendix 23, wherein
a response to a command transmitted from the host device includes status information indicating that the interface voltage switching has been completed successfully.

Appendix 26

A communication system, comprising:
the host device according to one of appendixes 17 to 19; and
the slave device according to one of appendixes 23 to 25.

Appendix 27

A communication system, comprising:
the host device according to one of appendixes 20 to 22; and
the slave device according to one of appendixes 23 to 25.

Appendix 28

An interface voltage switching method for switching an interface voltage of a host device and a slave device in the communication system according to appendix 26, the method comprising:
using the host device to transmit a command instructing to switch an interface voltage to the slave device;
using the slave device to return a response to the command instructing to switch the interface voltage;
using the host device to fix a level of the clock output to a low level;
using the host device to set one or more input/output terminals to an input status;
using the slave device to set one or more input/output terminals to a low level output status;
using the slave device to switch the input/output terminals from the low level output status to an input status when the interface voltage switching has been completed in the slave device;
using the host device to resume the clock output when the interface voltage switching has been completed in the host device; and
using the host device to detect that a signal indicating completion of the switching has been input into the input/output terminals after the clock output is resumed, and to determine that the interface voltage switching has been completed in the slave device.

Appendix 29

An interface voltage switching method for switching an interface voltage of a host device and a slave device in the communication system according to appendix 27, the method comprising:
using the host device to transmit a command instructing to switch an interface voltage to the slave device;
using the slave device to return a response to the command instructing to switch the interface voltage;
using the host device to fix a level of the clock output to a low level;
using the host device to set one or more input/output terminals to a low level output status;
using the slave device to set one or more input/output terminals to a low level output status;
using the slave device to switch the input/output terminals from the low level output status to an input status when the interface voltage switching has been completed in the slave device;
using the host device to resume the clock output when the interface voltage switching has been completed in the host device; and
using the host device to switch the input/output terminals from the low level output status to the input status when the interface voltage switching has been completed in the host device; and
using the host device to detect that a signal indicating completion of the switching has been input into the input/output terminals after the clock output is resumed, and to determine that the interface voltage switching has been completed in the slave device.

INDUSTRIAL APPLICABILITY

The interface circuit (device) of the present invention, the host device, the slave device, and the communication system including the interface circuit (device), and the interface voltage switching method enable an interface voltage to be switched while enabling the host device and the slave device to maintain the signal level of buses in a stable manner. The present invention is therefore applicable to a communication system in which an interface voltage can be switched using a small number of signal lines.

The invention claimed is:

1. An interface device, used in a host device connected to a slave device to transmit and receive data and/or a command to and from the slave device, that switches an interface voltage used for communication between the slave device and the host device, the interface device comprising:
    a clock output unit that outputs a clock signal for transmitting and receiving the data and/or the command;
    a terminal group including one or more input/output terminal units that transmits and receives the data and/or the command using one of a first interface voltage and a second interface voltage; and
    an interface voltage switching unit that selects one of the first interface voltage and the second interface voltage and switches the interface voltage used for communication between the host device and the slave device to the selected one of the first and second interface voltages,
    wherein the interface voltage switching unit includes
    a control unit,
    a clock control unit that controlled by the control unit, the clock control unit fixes a level of a signal output from the clock output unit to a first signal level when the interface voltage used for communication between the host device and the slave device is to be switched, and, when an interface voltage in the host device has been switched to the selected interface voltage, controls the clock output unit to output a clock signal using the selected interface voltage, and
    an input/output terminal control unit controlled by the control unit, the input/output terminal control unit sets the one or more input/output terminal units to an input state, monitors a level of an input signal into the one or more input/output terminal units when the interface voltage used for communication between the host device and the slave device is to be switched, and, when detecting that the level of the input signal into the one or more input/output terminal units becomes a signal level indicating that an interface voltage in the slave device has been switched to the selected interface voltage, transmits a notification indicating the detection result to the control unit, and
    the control unit determines that the interface voltage in the slave device has been switched when receiving the notification indicating that the interface voltage switching has been completed in the slave device transmitted from the input/output terminal control unit after the clock control unit is set to a state in which the clock signal is being outputted using the selected interface voltage.

2. The interface device according to claim 1, wherein the first signal level is a low level.

3. The interface device according to claim 1, wherein the control unit sets all the input/output terminal units to an input state when the interface voltage used for communication between the host device and the slave device is to be switched.

4. The interface device according to claim 1, wherein the control unit determines that the interface voltage in the host device and the interface voltage in the slave device have been switched when the level of the input signal into the input/output terminal units becomes a high level at the selected interface voltage.

5. An interface device used in a host device connected to a slave device to transmit and receive data and/or a command to and from the slave device, that switches an interface voltage used for communication between the slave device and the host device, the interface device comprising:
    a clock output unit that outputs a clock signal for transmitting and receiving the data and/or the command;
    a terminal group including one or more input/output terminal units that transmits and receives the data and/or the command using one of a first interface voltage and a second interface voltage; and
    an interface voltage switching unit that selects one of the first interface voltage and the second interface voltage and switches the interface voltage used for communication between the host device and the slave device to the selected one of the first and second interface voltages,
    wherein the interface voltage switching unit includes
    a control unit,
    a clock control unit controlled by the control unit, the clock control unit controls the clock output unit to output a signal having a first signal level when the interface voltage used for communication between the host device and the slave device is to be switched, and, when an interface voltage in the host device has been switched to the selected interface voltage, controls the clock output unit to output a clock signal using the selected interface voltage, and
    an input/output terminal control unit that is controlled by the control unit, the input/output terminal control unit sets the one or more input/output terminal units to an output state at the first signal level when the interface voltage used for communication between the host device and the slave device is to be switched, and, when the interface voltage in the host device has been switched to the selected interface voltage, switches the one or more input/output terminal units from the output state at the first signal level to an input state and monitors a level of an input signal into the one or more input/output terminal units, and transmits, when detecting that the level of the input signal into the one or more input/output terminal units becomes a signal level indicating that an interface voltage in the slave device has been switched to the selected voltage, a notification indicating the detection result to the control unit, and
    the control unit determines that the interface voltage in the slave device has been switched when receiving the notification indicating that the interface voltage switching has been completed in the slave device from the input/output terminal control unit after the clock control unit is set to a state in which a clock signal is being outputted using the selected interface voltage.

6. The interface device according to claim 5, wherein the control unit sets all the input/output terminal units to the output state at the first signal level when the interface voltage used for communication between the host device and the slave device is to be switched.

7. The interface device according to claim 5, wherein the interface voltage switching unit sets an input/output terminal unit for transmitting and receiving data to the output state at the first signal level when the interface voltage is to be switched.

8. The interface device according to claim 5 wherein the first signal level is a low level.

9. The interface device according to claim 8, wherein the interface voltage switching unit determines that the interface voltage in the host device and the interface voltage in the slave device have been switched when the level of the input signal into the input/output terminal units becomes a high level at the selected interface voltage.

* * * * *

UNITED STATES PATENT AND TRADEMARK OFFICE
CERTIFICATE OF CORRECTION

| | |
|---|---|
| PATENT NO. | : 8,212,429 B2 |
| APPLICATION NO. | : 13/272534 |
| DATED | : July 3, 2012 |
| INVENTOR(S) | : Masayuki Toyama, Takaharu Yoshida and Keisuke Sakai |

It is certified that error appears in the above-identified patent and that said Letters Patent is hereby corrected as shown below:

Title Page, Section (75), after "Keisuke Sakai" should read -- Kyoto (JP) --.

Signed and Sealed this
Sixteenth Day of October, 2012

David J. Kappos
*Director of the United States Patent and Trademark Office*